United States Patent Office 3,040,789
Patented June 26, 1962

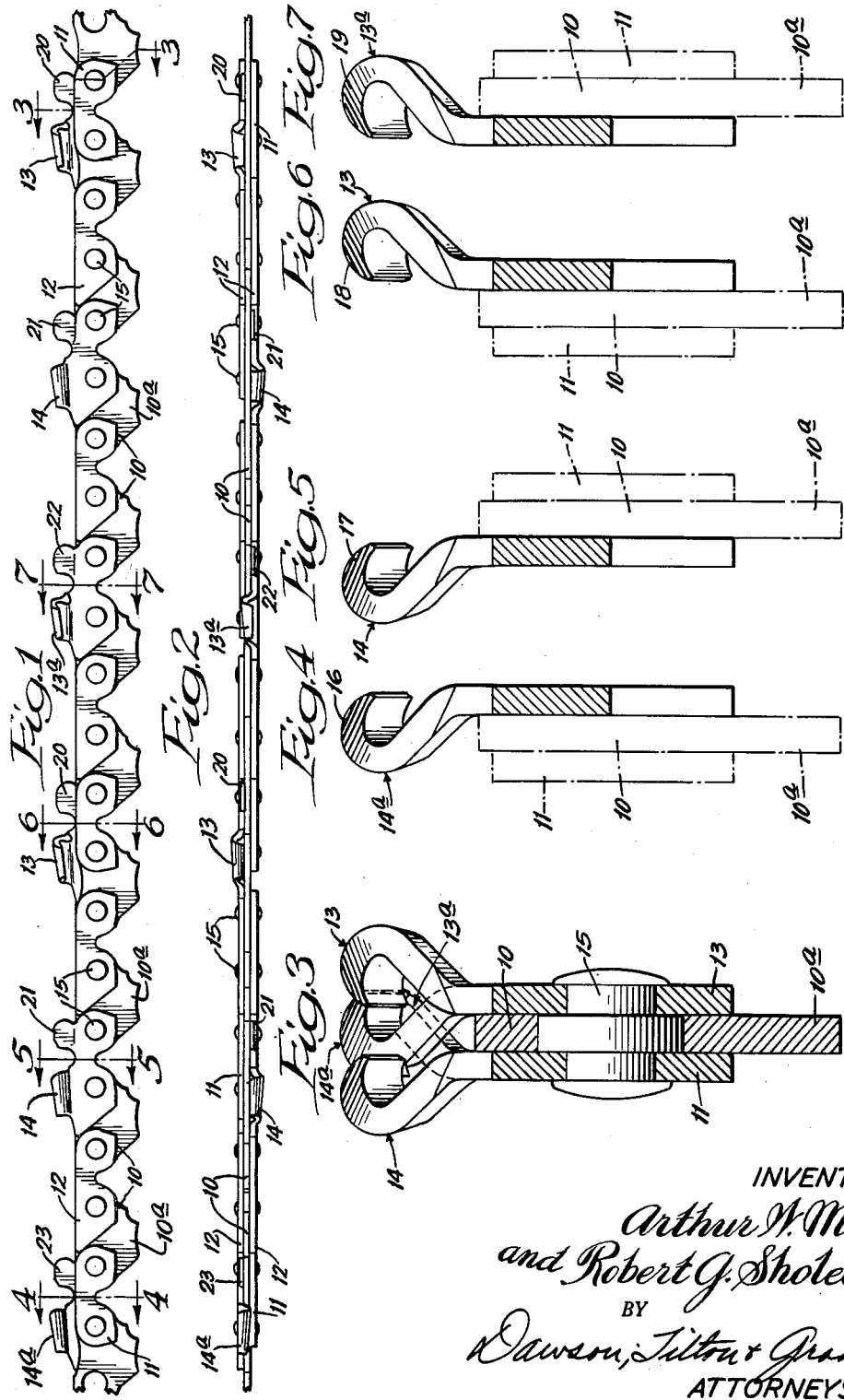

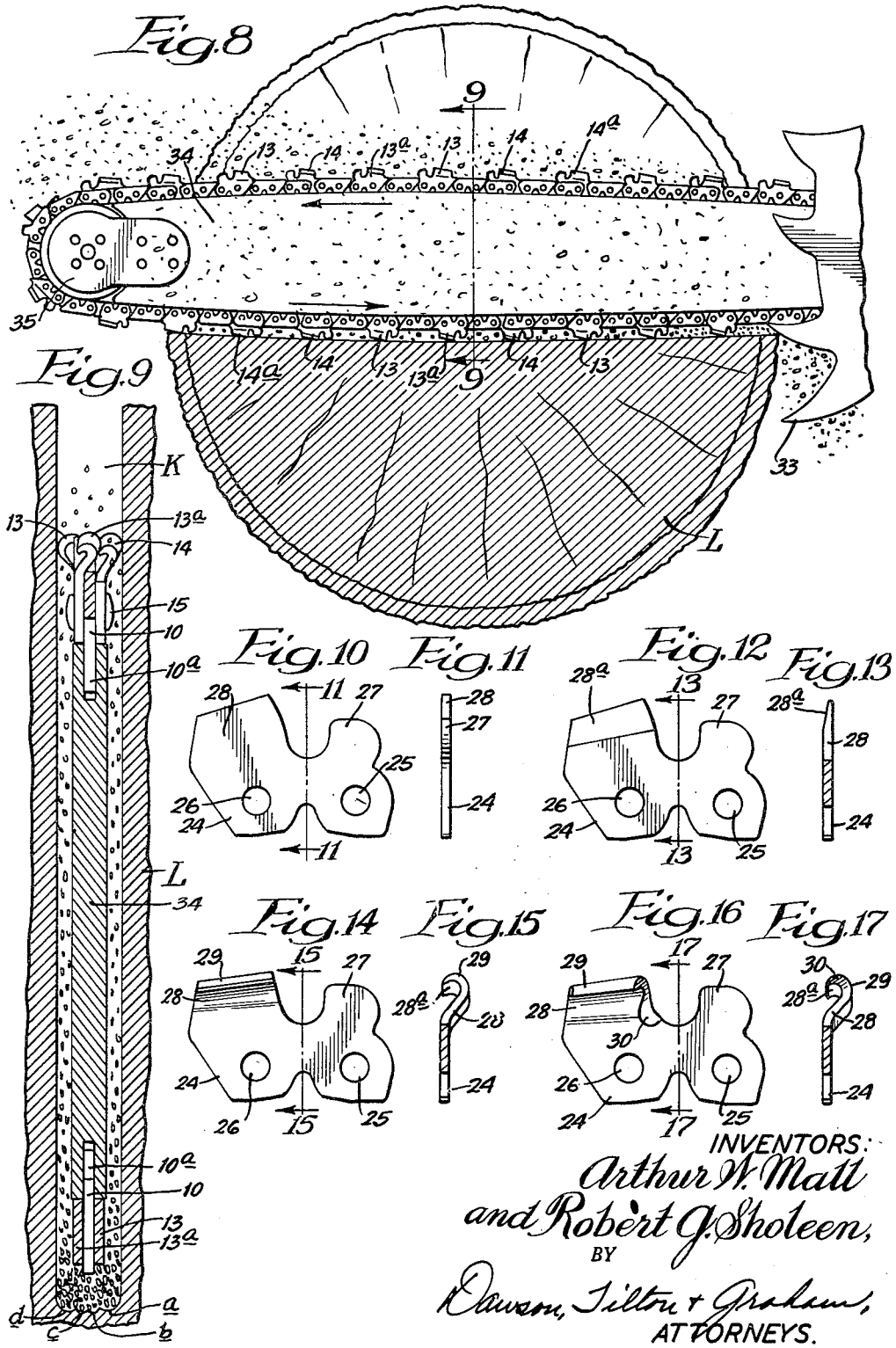

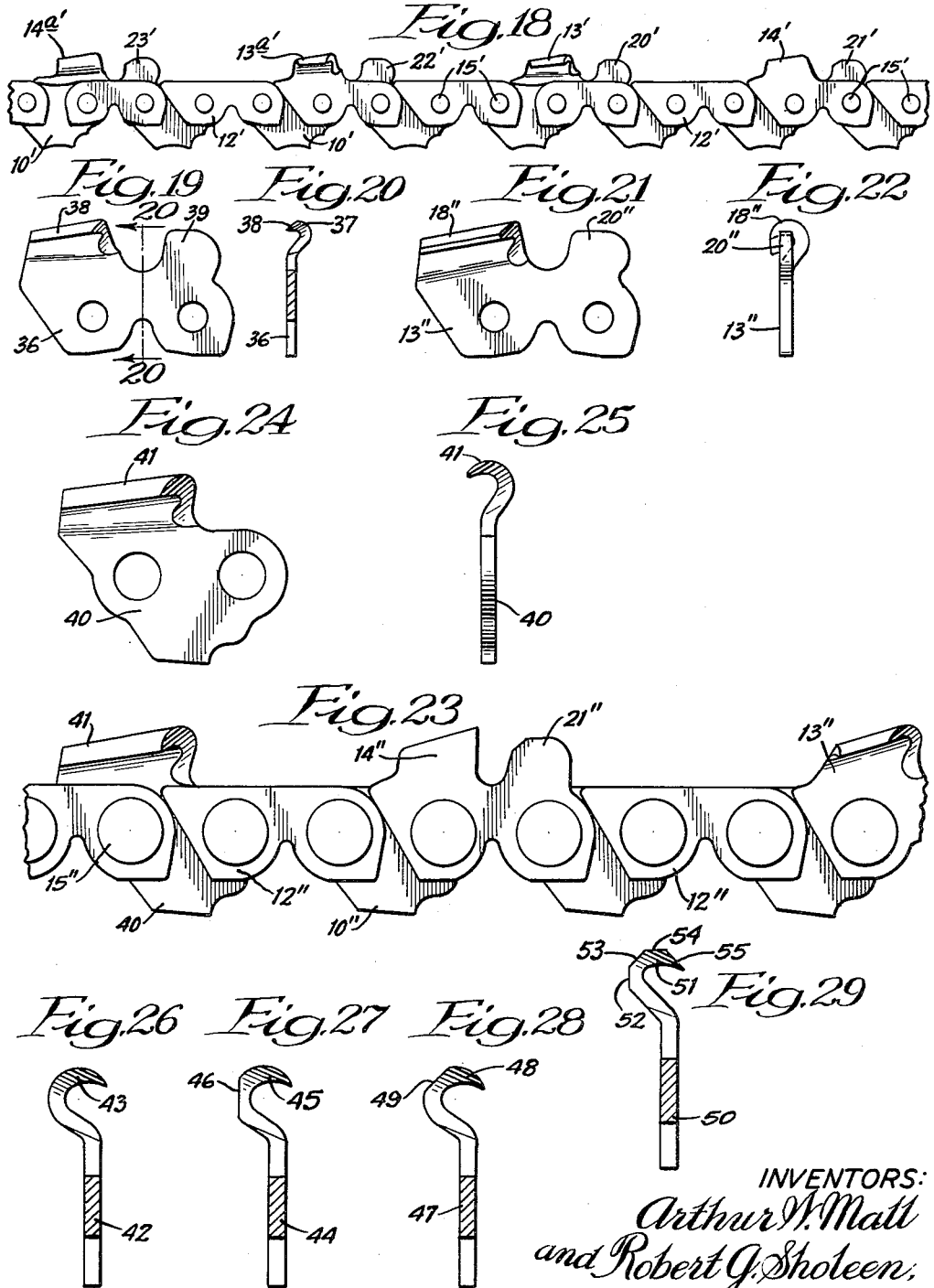

3,040,789
SAW CHAIN
Arthur W. Mall, Flossmoor, and Robert G. Sholeen, Chicago Heights, Ill., assignors, by mesne assignments, to Remington Arms Company, Inc., Bridgeport, Conn., a corporation of Delaware
Filed Nov. 5, 1956, Ser. No. 620,285
1 Claim. (Cl. 143—135)

This invention relates to a saw chain of the type which is used for sawing wood. The term "saw chain" as used in this application is intended to refer to that part of a power chain saw which consists principally of a series of pivotally joined links which carry the wood-removing elements, the links forming a closed loop around a guide or cutter bar, and being propelled therearound by an engine or motor through a sprocket-type drive. Such chain saws and the saw chain components thereof are widely used in the commercial lumbering industry for cutting standing and fallen trees, and they are coming to have a much wider applicability for other sawing operations. In the lumbering industry, the principal use of chain saws is for cross-cutting, although they are also used for rip cutting.

The present application is a continuation in part of our co-pending application Serial No. 534,214, filed September 14, 1955, now abandoned.

The general desirable characteristics of a saw chain can be easily stated. It should be economical to manufacture, durable in use, easy to sharpen in the field, and it should cut wood as efficiently as possible. The first three of these characteristics might be said to be minimum requirements for a commercially acceptable saw chain, while the last is a more intangible characteristic, and one which heretofore has not been given much consideration by the designers and manufacturers of saw chains. To put it another way, while there is still some room for improvement in saw chains with respect to their manufacturing cost, durability, and ease of sharpening, a much greater opportunity for improvement and challenge to the ingenuity of the designer is presented by the problem of how to improve the cutting efficiency of saw chains. At present, probably not more than one-sixth of the power delivered by the chain saw engine is actually used for the severing of the wood in the sawing operation. The rest of the power is lost through friction and in other ways.

It is therefore a general object of this invention to provide a saw chain which is just as economical to manufacture, of comparable durability, and can be sharpened as readily as any of the saw chains which are in use at the present time. Further, it is an object to provide a saw chain which is better than present day saw chains with respect to these characteristics, providing this is consistent with the overriding objective in our invention of improving the efficiency of operation of the saw chain. More specifically, a principal object of this invention is to provide a saw chain which cuts better and faster than any saw chains which have heretofore been known. Still another object is to provide a saw chain which operates well in all types and hardnesses of wood and under all conditions, such as when the wood is frozen, or pitchy, or sandy, etc. Further objects and advantages will appear as the specification proceeds.

This invention is shown in illustrative embodiments in the accompanying drawing, in which—

FIGURE 1 is a side elevational view of a section of a saw chain constructed in accordance with this invention, the section illustrated showing a complete sequence of the cutting teeth; FIG. 2, a top or plan view of the saw chain of FIG. 1; FIG. 3, a sectional view of the chain of FIGS. 1 and 2 as it would appear when looking at it head on, the section being taken on line 3—3 of FIG. 1; FIG. 4, a sectional view of one of the links providing a center cutting tooth, taken on line 4—4 of FIG. 1; FIG. 5, a sectional view of one of the links providing a side cutting tooth, taken on line 5—5 of FIG. 1; FIG. 6, a sectional view of one of the links on the other side of the chain providing a side cutting tooth, taken on line 6—6 of FIG. 1; FIG. 7, a sectional view of another link providing a center cutting tooth, this tooth being reversed with respect to that shown in FIG. 4, the section being taken on line 7—7 of FIG. 1; FIG. 8, a sectional operational view showing a chain saw equipped with the chain of FIGS. 1 to 7 as it would appear from the side when cutting through a log; FIG. 9, a partial sectional view of the same operation, taken on line 9—9 of FIG. 8; FIGS. 10 to 17, an illustration of the sequence of steps in manufacturing the center and side cutting teeth of the chain of FIGS. 1 to 9, FIGS. 10 and 11 illustrating the first step, FIGS. 12 and 13 the second step, and so on, and the even-numbered figures in this group showing the tooth from the side in each step while the odd-numbered figures are sectional views from the end of the tooth, FIG. 11 being taken on line 11—11 of FIG. 10, FIG. 13 being the section taken on line 13—13 of FIG. 12, and so on; FIG. 18, a modified embodiment which is similar to the embodiment of FIG. 1, except that the side and center cutting teeth are arranged in four-tooth sequences instead of six-tooth sequences, the chain of FIG. 18 being shown in side elevation; FIG. 19, a side elevational view of a tooth-bearing link which can be substituted for the tooth-bearing links of the previously described chain; FIG. 20, a sectional view of the link of FIG. 19, taken on line 20—20 of this figure; FIG. 21, another modified link, the view showing the link in side elevation; FIG. 22, an end view of the link of FIG. 21; FIG. 23, a side elevational view of a section of chain, showing part of a tooth sequence, the chain shown representing another embodiment of the present invention; FIG. 24, a side elevational view of one of the links providing a center cutting tooth of the chain of FIG. 23; FIG. 25, an end view of the link of FIG. 24; FIG. 26, a sectional view of one of the links of the chain of FIG. 23 which provides a side cutting tooth, the section being taken on line 26—26 of FIG. 23; and FIGS. 27 to 29 each show a further modified form of cutting teeth provided by side links, the teeth being usable either as side or center cutting teeth in accordance with the present invention.

Looking first at FIGS. 1 and 2, there is shown a saw chain composed of a plurality of center spacer links 10 connected together in part by side links 11 and 12, and also by side links 13, 14, 13a and 14a. Each of the links is provided with a pair of spaced openings through which extend the rivets 15, thereby pivotally interconnecting the center and side links to provide a flexible chain. The center links 10 provide a depending tang portion 10a designed to slide between the walls of a groove provided in the chain saw guide bar around which the chain travels during the operation of cutting, driven by a sprocket in the conventional manner.

Each of the side links 13, 14, 13a and 14a, as shown more clearly in FIGS. 4–7, provide cutting teeth having laterally-extending toe or blade portions, which are designated respectively 16, 17, 18 and 19, although in the illustration given, the toe portions are substantially identical on all of the cutting teeth. In the embodiment shown in FIGS. 1 and 2, there are only two types of cutting teeth and these are mirror images of each other, but by mounting the side links in different ways, a sequence of six cutting teeth is provided. More specifically, the side links 13 and 14, as shown more clearly in FIG. 3, provide side cutting teeth, while the side links 13a and 14a provide center cutting teeth, that is, the latter mentioned teeth cut down the center of the kerf at spaced distances from its outer side walls, which are formed by side cutting teeth 13 and 14. In the sequence shown, two side cutting teeth 13 and 14 are followed by the center cutting teeth 13a, which in turn is followed by two more side cutting teeth 13 and 14, and these in turn by the center cutting tooth 14a. Cutting teeth or links 13 and 14 are mirror images, being arranged respectively on the left-hand and right-hand sides of the chain, and similarly, teeth 13a and 14a are mirror images of each other, and are arranged respectively on the right-hand and left-hand sides of the chain, as determined when the chain is viewed in its advancing or cutting direction. Preferably, as illustrated by the embodiment of FIGS. 1 and 2, link 13a is identical to link 13, while link 14a is identical to link 14. This permits the entire chain to be made up of only two kinds of cutting links. Since part of the toe portions of the cutting teeth is offset with respect to the tooth shank, as illustrated in FIGS. 4-7, the position of the cutting portion of the tooth with reference to the center line of the chain can be varied depending on which side of the chain the link is mounted upon. For example, when link 13 is mounted on the right-hand side of the chain it provides link 13a, and when link 14 is mounted on the left-hand side of the chain it provides link 14a. The toe portions of the teeth are arranged so as to substantially overlap, as shown in FIG. 3, thus providing a series of at least three laterally offset and overlapping cutting teeth to sever the full kerf width. In the illustration given, the center cutting teeth 13a and 14a are also slightly offset with respect to each other, so that the full kerf width is cut by four teeth. With such arrangements, the toe portions of the teeth should extend for substantially less than one-half the full kerf width of the chain. It can also be observed that center cutting teeth 14a are reversed with respect to the direction of the principal lateral extent of their toe portions with respect to center cutting teeth 13a.

If desired, the tooth-bearing links can be spaced differently with respect to each other than as illustrated in FIGS. 1 and 2. For example, the side links 12 can be eliminated or additional side links can be incorporated, thereby increasing or decreasing the distance between the cutting teeth. The spacing shown, however, has been found to work out well in practice. Also, the laterally offset relation of the toe portion of the cutting teeth can be varied with respect to the longitudinal axis of the teeth-providing links. Usually, however, it will be desirable to have the downwardly extending side portions of the center cutting teeth lying inwardly of the downwardly extending side portions of the side cutting teeth. For best results, the center cutting teeth should have their side portions lying inwardly of the outermost edges of the side cutting teeth by a distance at least as great as the width of the toes on the center cutting teeth, thereby permitting the toes on the center cutting teeth to extend outwardly from the center cutting teeth toward the side cuting teeth without projecting beyond the extreme side boundaries of the echain as defined by the side cutting teeth. Within these limits, the degree of overlap of the toe portions of the side and center cutting teeth can be varied considerably.

As shown in FIGS. 1 and 2, the cutting teeth-providing links 13, 14, 13a and 14a also provide depth gauges 20, 21, 22 and 23, respectively. As is well known in the art, these blunt-edged gauges control the thickness of the cuts or bites of the cutting teeth. As described more fully in our copending application Serial No. 534,214, however, we prefer to have the depth gauges related in a novel way to the cutting teeth. The cutting teeth themselves, as shown more clearly in FIGS. 4-7, provide continuous cutting edges, being the upper or outer edges of the teeth as shown in FIGS. 4-7, which have a main section lying outwardly beyond the adjacent depth gauge and additional sections on each side thereof which extend downwardly below the adjacent depth gauge. As described in application Serial No. 534,214, this gives assurance that each tooth will cut a separate, complete chip, and this action is made even more positive by overlapping the sections of the cutting edges which extend below the limiting plane established by the depth gauges. It is also preferred that the toe portions of the cutting teeth have free ends, as illustrated in FIGS. 4-7, which extend laterally in spaced relation to the rest of the tooth and provide an open space beneath the toe portions. The toe portions themselves may be made in various shapes, although a generally curvilinear shape is preferred, that is, the best cutting action appears to be achieved when the tooth is transversely curved, although it may have some sections which approach flat areas. Further, the cutting action is improved when the toe portions of the teeth taper toward their free ends. Both the curving and tapering features are illustrated by FIGS. 4-7. If desired, as illustrated, the tapering can be so pronounced as to provide a substantially sharpened longitudinal extending edge of the teeth.

The combination of a cutting edge which approximates a smooth continuous curve and tapering of the toe to a substantially sharpened longitudinally extending edge has been found to be particularly effective in promoting cutting efficiency.

The component parts of the saw chain as shown in FIGS. 1 and 2 can be manufactured and assembled according to procedures well known in the art. Consequently, it will not be necessary to discuss these procedures in the present application. The manufacturing of a cutting tooth with a tapered toe while having a rounded cutting edge provided by the toe portion presents a special problem. One method of obtaining this result is illustrated in FIGS. 10-17, being described in greater detail and claimed in our copending application Serial No. 618,976, filed October 29, 1956, now Patent No. 2,854,866. The die cut blank 24, as shown in FIGS. 10 and 11, has rivet holes 25, 26, depth gauge tooth portion 27, and the upwardly extending section 28 out of which the cutting tooth will be subsequently formed. The outer end of portion 28 is ground off at an angle from the inside face of the tooth, as indicated in FIGS. 12 and 13, the ground surface being designated as 28a. The link 24 is then subjected to a die-forming operation in which the portion 28 is formed over to provide a rounded toe 29 with the ground surface 28a on the underside, as indicated in FIGS. 14 and 15. The shaping of the tooth is then complete, except for the usual sharpening, as indicated in FIGS. 16 and 17. The beveled surface 30 provides the chisel-type cutting edge at the front of the tooth.

*Operation*

A saw chain of the type described can be manufactured in any of the usual kerf widths and used on any of the commercially available chain saws. The saw chain of this invention can be used advantageously in connection with a direct drive-type chain saw, and it can also be used advantageously on gear reduction-drive chain saws. The direct drive chain saws may approach running speeds of around 3,000 feet per minute, which compares with the running speeds of gear reduction-drive chain saws of as low as 1,000 feet per minute. The chain of this invention is particularly adapted for high-speed operation.

In FIG. 8 the saw chain of FIGS. 1 and 2 is shown in actual use on a chain saw. The engine and driving sprocket are not shown, but at this end of the chain saw the sticker 33 can be seen. The guide bar 34 is also shown, which in the illustration given is equipped with the snap-on roller bearing assembly 35 as described more fully in the copending application of Arthur W. Mall, Serial No. 551,397, filed December 6, 1955. The saw chain is driven around the guide bar 34 and the roller bearing assembly 35 in the direction indicated by the two arrows shown in FIG. 8. As the chain moves downwardly into the log L, the cutting is being done by the lower or return run of the chain, which is moving toward the right as viewed in FIG. 8. The upper or out-going section of the chain, which is moving to the left as shown in FIG. 8, does no cutting, and heretofore has not performed any particular function in the cutting operation. It does, however, serve a very definite purpose in the saw chain of the present invention, as will be more fully described below.

In the cutting operation of saw chains constructed as previously described each cutting tooth severs its own separate chip or wood particle. With the preferred embodiment, the chips will be curved on the bottom, as indicated by the grooves a, b, c and d at the bottom of the kerf K in FIG. 9. The chips or wood particles will tend to be of rather small uniform dimensions, and they will be smooth due to the positive cutting action, which separates the chips without tearing. The elimination of the tearing action not only results in a considerable saving in power, but as applied in the present invention, it produces wood chips which are adapted for flowing through and out of the chain with a minimum of resistance and packing.

Not only do the small, smooth, uniform chips feed backwardly through the chain after they have been severed, while being carried along by the forward motion of the chain, but they also are thrown outwardly around the sides of the chain and upwardly into and above the outgoing, non-cutting section of the chain. This may have happened to some slight extent with prior chain saws, but it was not taken advantage of as a means of clearing the chips out of the kerf. With the chain saw of the present invention, a substantial portion of the chips are cleared by being discharged at the nose-end of the chain rather than the driving end, as has been the usual practice. This highly desirable result is brought about by the fact that the arrangement of the teeth on the chain throws the chips outwardly as well as inwardly. Heretofore, the severed chips have all been thrown inwardly toward the center of the chain, and have tended to pack along the center of the chain and build up on front of the cutting teeth, so that by the time the cutting teeth reached the discharge end of the chain, the chips would be in many cases packed so tightly that they could not be effectively discharged. In constrast to this, in the operation of the present saw chain, the chips are thrown inwardly and outwardly in a zig-zag pattern as the chain moves forward by the combined action of the side cutting teeth and the center cutting teeth. The outward motion of the chips away from the center of the chain tends to throw them up over the lower links at such velocities that they are carried upwardly over the cutter bar and into and over the upper running section of the chain, as indicated more clearly in FIGS. 8 and 9. The chips cast upwardly in this manner are then carried along by the upper section of the chain and thrown free of the chain at the nose end, as indicated more clearly in FIG. 8. This greatly increases the chip-clearing capacity of the chain, especially in long cuts. It also reduces friction and timber bind. Further, the scattering of the chips together with their zig-zag path of movement tends to distribute the chips along the lower cutting section of the chain, and thereby prevents the objectionable packing which has prevented the chips from being fully discharged in prior saw chains.

The tapering of the toes of the cutting teeth and the overlapping of these toe portions which lie below the depth gauges greatly promotes the efficiency of cutting. The tapered toe portions knife through the wood, cutting it cleanly and smoothly without tearing, while the free ends of the toes run above the wood, and are required to do no cutting. To a certain extent, the free ends of the toes also run in the grooves cut by the toe portion of the tooth with which it overlaps. Without this overlap and tapering, there would continue to be some tearing of the wood, and separation of the wood by a breaking or scratching action rather than by a clean-cutting type of separation.

The chain is very smooth running and shows an unusual degree of stability as compared with other saw chains. The fact that more than two of the kerf teeth are used to cut the full width of the kerf permits the teeth to be smaller than would ordinarily be required, thereby the teeth can be closer to the cutter bar. This promotes the stability of the chain, since the tendency of the chain to wobble in the cut is accentuated as the cutting edges of the teeth are spaced further from the guide bar. The smaller teeth also tend to be more durable. They have a smaller lateral extent which makes them less subject to breakage. The fact that all teeth are of the same shape and cut similarly, although they are arranged in six-teeth sequences, also tends to promote the stability of the chain. Although the embodiment described does not show the cutting end of the teeth extending equal amounts on each side of the center line of the shanks of the teeth, there is equal cutting on both sides of the toe portion because of the continuous curvature of the toe and its downward extent on each side of the cutting section. The chain is well adapted for both cross-cutting and rip-cutting and it can readily be shaped with a round file at any desired angle to promote self-feeding or for some other purpose. Since there is less of the cutting surfaces to file against, it is easier to maintain the chain with all of the cutting teeth filed at the proper angle. The series of grooves which form the bottom of the kerf tend to keep the chain running freely through the kerf without pinching or binding. If the chain tends to bind, as may sometimes happen in bucking cuts, or even in felling cuts, the chain can easily be freed by tipping the guide bar from side to side, thus enlarging the kerf and freeing the chain. The use of the chain of the present invention in this way has been found to be particularly effective, and to provide better results than other types of chains which have heretofore been known.

Saw chains constructed in the manner described cut well in all types and hardnesses of wood. A satisfactory cutting action can be maintained even when the wood is frozen, or under other adverse conditions such as the presence of pitch or sand.

The modifications shown in FIGS. 18–29 can be employed while achieving some or all of the advantages previously described for the saw chain of FIGS. 1 and 2. For example, the saw chain illustrated in FIG. 18 is substantially like that of FIGS. 1 and 2, except that the cutting teeth are arranged in a four-tooth sequence instead of a six-tooth sequence. For purpose of clarity of comparison, the corresponding parts of the chain of FIG. 18 have been given the same numbers as the chain of FIGS. 1 and 2, except that the numbers have been primed. It will be noted that the sequence starts with the right-hand side cutting tooth 14' instead of the left-hand side cutting tooth, as in the embodiment of FIGS. 1 and 2. In the embodiment of FIG. 18, the side cutting tooth 14' is followed by the side cutting tooth 13'. Next comes the center cutting tooth 13a', and this is followed by the center cutting tooth 14a', making a complete sequence of four teeth.

FIGS. 19 and 20 illustrate a modified tooth shape which can be substituted for the cutting teeth on the chain of FIGS. 1 and 2 or FIG. 18. This tooth is designated by the number 36 and corresponds in structure except for the fact that the toe portion 37 is ground off at 38 to provide the outer downward extending portion of the cutting edge. The relationship between the cutting edge and the tooth depth gauge 39, however, would be the same as previously described.

FIG. 23 shows another modified chain construction. Here, again, the corresponding parts have been given the same numbers, except that the numbers have been double primed to indicate the modification. The side cutting teeth 13″ and 14″ are of a somewhat different shape, as illustrated by FIGS. 21 and 22. As shown therein, the toe portion 18′ of the side link 13′ is centered with respect to the depth gauge 20′, that is, it extends for an equal distance on each side of the depth gauge, or the vertical axis of the link. The center cutting teeth are provided by special center links 40 which are substituted for some of the center spacer links 10″, as shown in FIG. 23. The special center link 40 extends upwardly above the chain and provides a hook-shaped cutting element 41, which cuts down the center of the kerf, and spans the distance between the inner ends of the toe portions of the side cutting teeth 13′ and 14′. The construction of center links 40 is shown more clearly in FIGS. 24 and 25. It will be understood that the sequence of the FIG. 23 chain can be completed either by following center link 40 with two more side cutting links 13′ and 14′, and then by another special center link, which will provide a hook-shaped tooth having a toe portion extending in the laterally opposite direction from the toe 41 of tooth link 40; or the sequence can be completed by simply adding the other special link just referred to behind the link 40. This will give either a six-tooth or a four-tooth sequence as has been previously described in connection with the embodiments of FIGS. 1 and 18.

FIGS. 26–29 show sections of side links, which provide cutting teeth of various modified shapes. For some purposes, it may be desirable to employ one of the shapes shown in FIGS. 26–29 instead of the ones previously described. These side links having cutting teeth of these shapes would be used in the same way in the present invention as previously described. Link 42, as shown in FIG. 26, provides a cutting tooth having a toe 43 with a substantially cylindrical cutting edge. Link 44, shown in FIG. 27, has a toe portion 45 substantially the same shape as the toe portion 43 of link 42. It has a flat side portion 46, however, which forms a rather sharp angle with the cylindrical cutting edge of the toe portion 45. The cutting tooth on link 47 (FIG. 28) is similar to that shown in FIG. 27, except that the flat area 49 is angularly related to the toe portion 48, instead of being substantially parallel to the vertical axis of the tooth. The link 50 of FIG. 29 provides a tooth having a cutting edge made up of a series of straight edges provided by flat outer tooth areas 52, 53, 54 and 55.

While in the foregoing specification this invention has been described in relation to certain specific embodiments thereof and many details have been set forth for purpose of illustration, it will be apparent to those skilled in the art that the invention is susceptible to other embodiments and that many of the details described therein can be varied widely without departing from the basic principles of the invention.

We claim:

In a saw chain having a plurality of pivotally connected links, cutting teeth provided by some of said links, each of said cutting teeth having a transversely-extending toe portion and a downwardly-extending side portion, said teeth being arranged on said chain in sequences including only six teeth and comprising, in the order stated, a pair of side cutting teeth, one center cutting tooth, a second pair of side cutting teeth, and another center cutting tooth, said first and second mentioned center cutting teeth being reversed with respect to each other, the toe portions of the said side and center cutting teeth in said sequences being laterally offset with respect to each other and extending for less than one-half of the full kerf width of said chain, said toe portions of said cutting teeth tapering toward their free ends, and the spaces beneath said toe portions adjacent said side portions being open, some of said links also providing depth gauge teeth adjacent said cutting teeth, the said toe portions of both said side cutting teeth and said center cutting teeth providing continuous cutting edges having sections lying outwardly beyond the adjacent depth gauges, and other sections on each side of said first-mentioned sections extending downwardly below said adjacent depth gauges.

References Cited in the file of this patent

UNITED STATES PATENTS

| | | |
|---|---|---|
| 2,326,854 | Hassler | Aug. 17, 1943 |
| 2,565,502 | Johanson | Aug. 28, 1951 |
| 2,713,276 | Siverson | July 19, 1955 |
| 2,730,143 | Ryde | Jan. 10, 1956 |
| 2,744,548 | Stephenson et al. | May 8, 1956 |
| 2,826,226 | Donley | Mar. 11, 1958 |
| 2,832,380 | Crowe | Apr. 29, 1958 |